Figure 3:
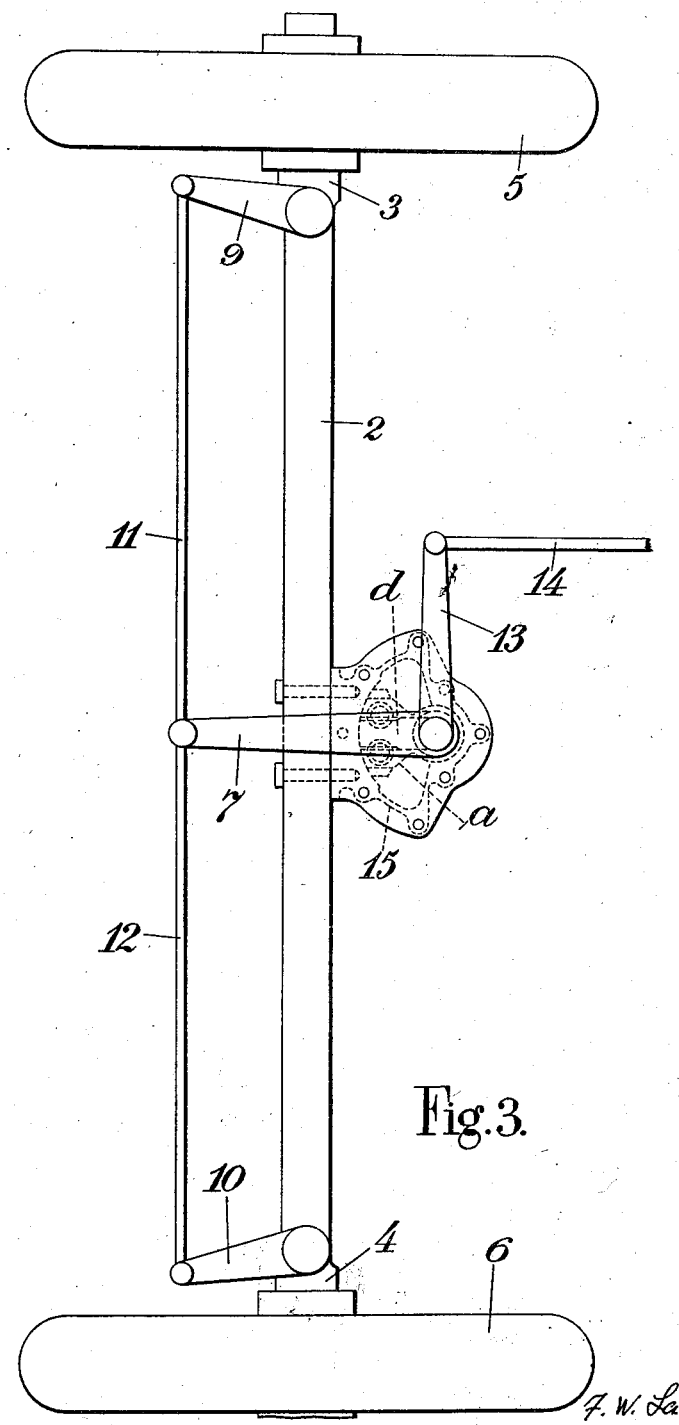

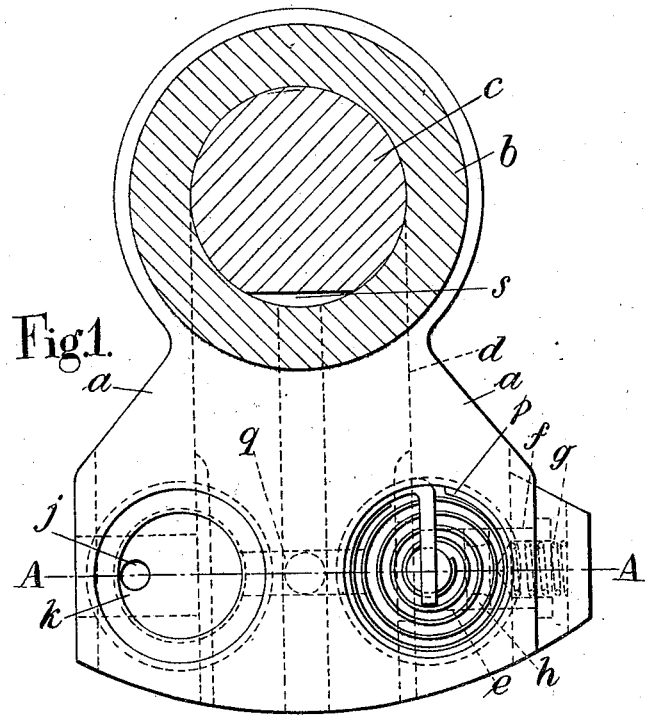
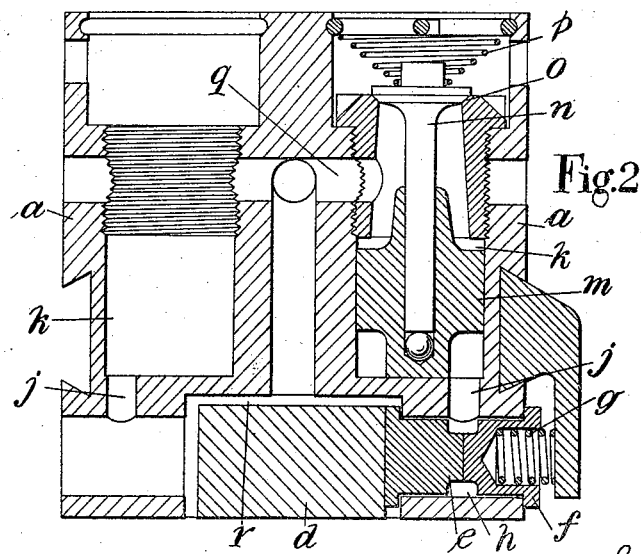

Patented Mar. 15, 1927.

1,621,169

UNITED STATES PATENT OFFICE.

FREDERICK WILLIAM LANCHESTER, OF MOSELEY, BIRMINGHAM, ENGLAND.

STEERING MECHANISM OF ROAD VEHICLES.

Application filed September 9, 1926, Serial No. 134,557, and in Great Britain October 3, 1925.

The present invention relates to improvements in the steering mechanism of power-propelled road vehicles and refers more particularly to an improved damper adapted to be embodied in such mechanism whose function is to intercept road shock and to damp out or prevent vibratory movements of the steering road wheels and steering mechanism, such as disturbances of a character commonly referred to as wheel wobble or shimmy.

It has been proposed to employ a simple damping device or dash-pot to control the steering mechanism for the purpose indicated. It has been further proposed to employ a device comprising valves in conjunction with the dash-pot adapted to free the steering mechanism when operated from the steering handwheel, but which remain closed and leave the damper functionally operative against pivotal movements of the road wheels when initiated by roughness or pot-holes in the road or other extraneous cause.

The object of the present invention is in mechanism of the latter type to minimize the extent of free movement required to operate the valves and give a free passage for liquid to flow from one side of the damper piston to the other. It is necessary, if a steering mechanism is to act perfectly at high speeds, that the back-lash between the operating handwheel and road wheels should be reduced to the minimum possible.

Referring to the accompanying diagrammatic drawings:—

Figure 1 is a plan view partly in section of a convenient construction in accordance with the present invention, certain duplicate parts being omitted, and Figure 2 is a cross-sectional view on the line A—A of Figure 1, and Figure 3 illustrates in plan the device applied to a steering axle.

In one mode of carrying the present invention into effect as illustrated in Figures 1 to 3, I provide a damper, preferably of the semi-rotary type, coupled directly or indirectly to the steering linkwork, the piston $a$ of the said damper being a sufficiently close fit within the segmental cylinder (15, Figure 3) to prevent the rapid movement of the steering road wheels about their pivots, but with sufficient leakage to allow of the said wheels moving slowly under the influence of road reaction to allow the steering gear to "pay off" or straighten out after turning a corner. The leakage for this purpose may be made adjustable by a by-pass controlled by a regulating screw or may be determined once and for all by the degree of fit of the piston and amount of leakage permitted past same.

In the example illustrated the piston is made integral with a hollow shaft $b$ to the upper end of which a lever connected by a link to one of the coupling arms is keyed and through the hollow shaft is arranged an actuating shaft $c$ controlled by linkwork from the steering handwheel. The actuating shaft $c$ is furnished with a radial projection or arm $d$ housed within the piston aforesaid and in the walls of the piston $a$ on either side of the arm $d$ are provided two pairs of primary valves having a very small movement, one pair being shown at $e$, $f$, while the corresponding duplicate pair is omitted. The valve $f$ is closed on its seat by a spring $g$ and the projection on the actuating arm $d$ acts on the head of the inner valve $e$ when the steering handwheel is operated in one direction, thus closing the valve $e$ on to its seat and at the same time opening the valve $f$.

A similar action occurs as regards the duplicate valves (omitted from the drawings) when the steering handwheel is operated in the reverse direction.

From a chamber $h$ provided as shown between the said valve seats a duct $j$ is carried to a cylindrical cavity $k$ machined in the body of the piston, and within this cylindrical cavity a secondary piston $m$ is fitted arranged to operate a secondary valve $n$ opening outwards in association with a fixed seating $o$. This valve is normally closed by a spring $p$ and gives vent to a common chamber or duct $q$ so that upon the secondary valve $n$ being lifted by pressure admitted from the corresponding primary valve oil or other liquid can pass through the said valve by way of the common duct and through the other identical secondary valve (not shown) which opens automatically against its spring.

It will be understood that an identical primary valve, secondary valve, spring, seating and duct are provided in respect of the left-hand part of Figure 2 although these are omitted from the drawings for the sake of clearness.

The primary valves may conveniently be made each in two parts, as illustrated, that is to say, two valves e, f whose stems accurately butt the one on the other, this provision being advantageous as allowing the said valves to be easily assembled, a matter which otherwise presents some difficulty owing to the valves being double seated.

The action of the above-described valve mechanism is as follows: So long as the actuating mechanism and arm d are inoperative the valves are all held to their seats by the springs provided and any movement or attempted movement of the piston a is resisted by the oil or other liquid which has no way of escape other than by leakage. The ducts (j) communicating with the primary valves (e, f) remain in communication with the space r in which the actuating projection or arm is housed and this space is vented through s to the common duct q of the secondary valve system so that the pressure cannot rise above that on the side of the piston which is not under pressure except so far as due to the secondary valve springs (p). When, however, the arm d is operated it moves, say, the primary valves e, f, closing the connection between the duct j and the housing space r and opening the said duct to the pressure side of the piston a. Pressure is thereby admitted to the secondary piston m controlling the secondary valve n which opens to the pressure side of the damper piston and so allows the oil to escape and pass through the damper piston, the opposite secondary valve opening against its spring automatically.

The movement permitted to the primary valve f may be as little as a few thousandths of an inch, the amount of oil having to pass same being only sufficient to operate one or other of the secondary valves and this motion which appears as back-lash in the steering handwheel becomes negligible in comparison with that necessary to open a valve of sufficient area directly.

If desired, in order to still further limit the duty performed by the primary valves, intermediate valves operating in like manner may be arranged to control the secondary valves, but for ordinary purposes an area adequate for the passage of oil can be obtained with a simple primary and secondary system as hereinbefore described.

The device is shown in Figure 3 mounted upon a front axle 2 to which stub axles 3, 4 carrying wheels 5, 6 are pivoted. The piston a operating within the segmental cylinder 15 is rigid with an arm 7 and the latter is coupled to the arms 9, 10 on the stub axle mountings by links 11 and 12 respectively. The arm d, however, is rigid with an arm 13 which is coupled by a link 14 to the steering control mechanism (not shown).

Having now described my invention what I claim as new and desire to secure by Letters Patent is:—

1. Hydraulic steering damping mechanism including in combination a damper piston, a cylinder therefor, a duct through said piston, a pair of damping release valves controlling said duct, hydraulic power operating means on said piston for each of said valves, an auxiliary valve on said piston associated with each of said hydraulic power operating means and means for manually actuating said auxiliary valves alternatively as required.

2. Hydraulic steering damping mechanism including in combination a damper piston, a cylinder therefor, a duct through said piston, a pair of damping release valves controlling said duct, a hydraulic piston associated with each of said valves and operating in a cylindrical bore in said damper piston, a two-part auxiliary valve controlling each of said cylindrical bores and means for manually actuating said auxiliary valves alternatively as required.

3. Hydraulic steering damping mechanism as claimed in claim 1 including also a further passageway through said damper piston constituting a constricted hydraulic connection.

4. Hydraulic steering damping mechanism as claimed in claim 1 including also a further pair of valves interposed between the respective damping release valves and auxiliary valves.

In testimony whereof I have signed my name to this specification.

FREDERICK WILLIAM LANCHESTER.